United States Patent
Wu et al.

(10) Patent No.: US 11,363,644 B2
(45) Date of Patent: Jun. 14, 2022

(54) METHODS AND APPARATUS FOR INDICATING CHANNEL ACCESS

(71) Applicant: GUANGDONG OPPO MOBILE TELECOMMUNICATIONS CORP., LTD., Dongguan (CN)

(72) Inventors: Zuomin Wu, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/345,329

(22) Filed: Jun. 11, 2021

(65) Prior Publication Data

US 2021/0307083 A1 Sep. 30, 2021

Related U.S. Application Data

(63) Continuation of application No. PCT/CN2019/111781, filed on Oct. 17, 2019.

(51) Int. Cl.
*H04W 74/08* (2009.01)
*H04W 72/04* (2009.01)
(Continued)

(52) U.S. Cl.
CPC ... *H04W 74/0841* (2013.01); *H04W 72/0453* (2013.01); *H04W 72/14* (2013.01);
(Continued)

(58) Field of Classification Search
CPC ......... H04W 74/0841; H04W 72/0453; H04W 72/14; H04W 74/0816; H04W 74/0866;
(Continued)

(56) References Cited

U.S. PATENT DOCUMENTS

| | | |
|---|---|---|
| 2019/0159243 A1 | 5/2019 | Tao et al. |
| 2020/0015094 A1 | 1/2020 | Noh et al. |

(Continued)

FOREIGN PATENT DOCUMENTS

| | | |
|---|---|---|
| CN | 105704834 A | 6/2016 |
| CN | 106453181 A | 2/2017 |

(Continued)

OTHER PUBLICATIONS

English Translation of CN109413744A, Xu et al., Publication Date Mar. 1, 2019 [retrieved on Oct. 22, 2021], Retrieved from the Internet: (Year: 2019).*

(Continued)

*Primary Examiner* — Omar J Ghowrwal
(74) *Attorney, Agent, or Firm* — Sheppard, Mullin, Richter & Hampton LLP

(57) ABSTRACT

The present disclosure discloses a method and an apparatus for indicating channel access. The method includes: receiving first indication information transmitted by a network device; and obtaining one or more channel access parameters based on the first indication information. The one or more channel access parameters are used for determining channel access for a target uplink transmission. The first indication information transmitted by the network device is received, and the first indication information may be based on a command field in existing information, without the need for a new command field for indicating channel access for the target uplink transmission.

13 Claims, 3 Drawing Sheets

(51) Int. Cl.
  *H04W 72/14* (2009.01)
  *H04W 74/00* (2009.01)
(52) U.S. Cl.
  CPC ..... *H04W 74/006* (2013.01); *H04W 74/0816* (2013.01); *H04W 74/0833* (2013.01); *H04W 74/0866* (2013.01); *H04W 74/0808* (2013.01)
(58) Field of Classification Search
  CPC ......... H04W 74/0808; H04W 74/0833; H04W 74/006
  See application file for complete search history.

(56) References Cited

U.S. PATENT DOCUMENTS

| | | | |
|---|---|---|---|
| 2020/0053798 A1* | 2/2020 | Tsai | H04W 72/14 |
| 2020/0107322 A1* | 4/2020 | Lunttila | H04W 72/0453 |
| 2020/0344810 A1* | 10/2020 | Xiong | H04L 1/1861 |
| 2021/0051713 A1* | 2/2021 | Hedayat | H04W 74/0833 |

FOREIGN PATENT DOCUMENTS

| | | | |
|---|---|---|---|
| CN | 106612553 A | 5/2017 | |
| CN | 106686727 A | 5/2017 | |
| CN | 109413744 A | 3/2019 | |
| EP | 3435580 A1 | 1/2019 | |
| EP | 3541139 A1 | 9/2019 | |
| WO | 2018182264 A1 | 10/2018 | |
| WO | WO-2020017391 A1 * | 1/2020 | .......... H04W 72/042 |

OTHER PUBLICATIONS

Item U continued: URL: <http://translationportal.epo.org/emtp/translate/?ACTION=description-retrieval&COUNTRY=CN&ENGINE=google&FORMAT=docdb&KIND=A&LOCALE=en_EP&NUMBER=109413744&OPS=ops.epo.org/3.2&SRCLANG=zh&TRGLANG=en>. pp. 1-37 (Year: 2019).*

English Translation of WO 2020/017391 A1, Liu et al., PCT filing date Jul. 17, 2019 [retrieved on Oct. 22, 2021], Retrieved from the Internet: (Year: 2019).*

Item W continued: URL: <http://translationportal.epo.org/emtp/translate/?ACTION=description-retrieval&COUNTRY=WO&ENGINE=google&FORMAT=docdb&KIND=A1&LOCALE=en_EP&NUMBER=2020017391&OPS=ops.epo.org/3.2&SRCLANG=ja&TRGLANG=en>. pp. 1-42 (Year: 2019).*

5G Americas Whitepaper, Wireless Technology Evolution Transition from 4G to 5G 3GPP Releases 14 to 16, Oct. 2018 [retrieved on Jan. 25, 2022}. Retrieved from the Internet <URL: https://www.5gamericas.org/wp-content/uploads/2019/07/3GPP_Rel_14-16_10.22-final_for_upload.pdf>, pp. 1-271 (Year: 2018).*

International Search Report and Written Opinion dated May 28, 2020 in International Application No. PCT/CN2019/111781. English translation attached.

Extended European Search Report dated Dec. 7, 2021 received in European Patent Application No. EP 19949540.9.

* cited by examiner

METHODS AND APPARATUS FOR INDICATING CHANNEL ACCESS

CROSS-REFERENCE TO RELATED APPLICATION

The present application is a continuation of International Application No. PCT/CN2019/111781, filed on Oct. 17, 2019, which is hereby incorporated by reference in its entireties.

TECHNICAL FIELD

The present disclosure relates to communication technology, and more particularly, to a method and an apparatus for indicating channel access.

BACKGROUND

The unlicensed spectrum is assigned by countries and regions for radio device communication. This spectrum is usually considered to be a shared spectrum, that is, communication devices in different communication systems can use this spectrum as long as they meet regulatory requirements set by the countries or regions for the spectrum, without the need to apply for a proprietary spectrum authorization from governments.

In order to allow various communication systems that use the unlicensed spectrum for wireless communication to coexist friendly on this spectrum, some countries or regions have stipulated legal requirements that must be met when using the unlicensed spectrum. For example, a communication device shall follow a "Listen Before Talk (LBT)" principle, that is, the communication device needs to listen to a channel on the unlicensed spectrum before transmitting signals on the channel. Only when the result of the channel listening indicates that the channel is idle, the communication device can transmit signals. If the result of the channel listening by the communication device on the channel over the unlicensed spectrum indicates that the channel is busy, the communication device cannot transmit signals.

Therefore, on the unlicensed spectrum, a type of LBT needs to be indicated during a random access procedure. However, this will increase the bit overhead, and the size of information on the unlicensed spectrum is inconsistent with the size of information on the licensed spectrum.

SUMMARY

The present disclosure provides a method and an apparatus for indicating channel access, capable of solving the problem associated with the increase in the bit overhead and the inconsistency between the size of information on the unlicensed spectrum and the size of information on the licensed spectrum.

In a first aspect, a method for indicating channel access is provided according to an embodiment of the present disclosure. The method is applied in a terminal device and includes: receiving first indication information transmitted by a network device; and obtaining one or more channel access parameters based on the first indication information. The one or more channel access parameters are used for determining channel access for a target uplink transmission.

In a second aspect, a method for indicating channel access is provided according to an embodiment of the present disclosure. The method is applied in a network device and includes: transmitting first indication information to a terminal device. The first indication information is used for obtaining one or more channel access parameters. The one or more channel access parameters are used for determining channel access for a target uplink transmission.

In a third aspect, an apparatus for indicating channel access is provided. The apparatus includes: a receiving module configured to receive first indication information transmitted by a network device; and an obtaining module configured to obtain one or more channel access parameters based on the first indication information. The one or more channel access parameters are used for determining channel access for a target uplink transmission.

In a fourth aspect, an apparatus for indicating channel access is provided. The apparatus includes: a transmitting module configured to transmit first indication information to a terminal device. The first indication information is used for obtaining one or more channel access parameters. The one or more channel access parameters are used for determining channel access for a target uplink transmission.

In a fifth aspect, a terminal device is provided according to an embodiment of the present disclosure. The terminal device includes a processor and a memory. The memory is configured to store a program executable on the processor. The program, when executed by the processor, causes the processor to perform the method for indicating channel access according to any of the above aspects.

In a sixth aspect, a computer readable storage medium is provided according to an embodiment of the present disclosure. The computer readable storage medium stores a computer program which, when executed, implements the method for indicating channel access according to any of the above aspects.

In a seventh aspect, a computer program product is provided according to an embodiment of the present disclosure. The computer program product is stored in a non-transitory computer readable storage medium. The computer program product, when executed, implements the method for indicating channel access according to any of the above aspects.

In an eighth aspect, a chip is provided according to an embodiment of the present disclosure. The chip includes a processor. The processor is configured to invoke and execute a computer program from a memory to cause a device provided with the chip to perform the method for indicating channel access according to any of the above aspects.

In a ninth aspect, a computer program is provided according to an embodiment of the present disclosure. The computer program, when executed, implements the method for indicating channel access according to any of the above aspects.

The solutions according to the embodiments of the present disclosure may have the following advantageous effects.

First indication information transmitted by a network device is received, and one or more channel access parameters are obtained based on the first indication information. The one or more channel access parameters are used for determining channel access for a target uplink transmission. The first indication information transmitted by the network device is received, and the first indication information may be based on a command field in existing information, without the need for a new command field for indicating channel access for the target uplink transmission. In this way, the bit overhead of the information can be reduced and the complexity in design and implementation can be reduced, thereby solving the problem associated with the inconsistency between the size of information on the unlicensed spectrum and the size of information on the licensed spectrum and the high bit overhead of information on the unlicensed spectrum.

It should be understood that the above general description and the following detailed description are only exemplary and are not intended to limit the present disclosure.

BRIEF DESCRIPTION OF DRAWINGS

The drawings, which are incorporated into the description and constitute a part of the description, show embodiments of the present disclosure, and are provided for explaining the principle of the present disclosure along with the description.

DESCRIPTION OF EMBODIMENTS

Here, the exemplary embodiments will be described in detail, with examples thereof shown in the figures. When the following description refers to the figures, unless indicated otherwise, same numbers in different figures represent same or similar elements. The implementations described in the following exemplary embodiments do not represent all implementations that are consistent with the embodiments of the present disclosure. On the contrary, they are only examples of methods and apparatus consistent with some aspects of the present disclosure as defined in the claims as attached. All other embodiments obtained by those skilled in the art based on the embodiments of the present disclosure without any inventive efforts are to be encompassed by the scope of the present disclosure.

Figure 1:
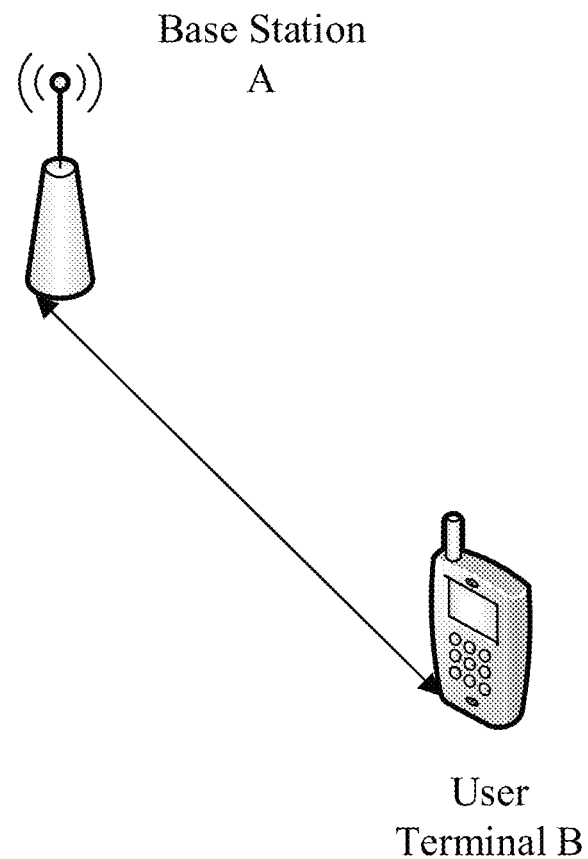
FIG. 1 is a schematic diagram showing a network architecture of a communication system where the embodiments of the present disclosure may be applied.

FIG. 1 shows a system architecture of a communication system where the following embodiments of the present disclosure may be applied. The system architecture includes a base station A and a user terminal B.

A four-step process is used in a random access procedure between the user terminal B and the base station A.

In the first step, the user terminal B transmits a random access preamble sequence (message 1 or Msg1) to the base station A.

In the second step, upon detecting that the user terminal B transmits the access preamble sequence, the base station A transmits a Random Access Response (RAR), i.e., message 2 (Msg2), to the user terminal B to inform the user terminal B of an uplink resource it can use for transmitting a message 3 (Msg3), assign Radio Network Temporary Identifier (RNTI) to the user terminal B, and provide a time advance command to the user terminal B. If the user terminal B fails to detect the RAR in an RAR window, it retransmits a Physical Random Access Channel (PRACH) sequence. If the user terminal B detects the RAR in the RAR window, the user terminal B transmits the Msg3 in accordance with uplink grant information indicated in the RAR.

In the third step, after the user terminal B receives the RAR, it transmits the Msg3 in the uplink resource specified in the RAR message. This step allows Hybrid Automatic Repeat-reQuest (HARQ) based retransmission.

In the fourth step, the base station A transmits a Msg4 to the user terminal B, containing a contention resolution message and allocating uplink transmission resources for the user terminal B. This step allows HARQ based retransmission. When the user terminal B receives the Msg4 transmitted by the base station A, it detects whether Msg4 includes a part of the Msg3 transmitted by the user terminal B. If not, it indicates that the random access procedure of the user terminal B has succeeded, otherwise it is considered that the random access procedure has failed, and the user terminal B needs to initiate the random access procedure again from the first step.

In the four-step random access procedure, the RAR transmitted by the base station A to the user terminal B is a response to the Msg1, and the Random Access RNTI (RA-RNTI) used by the base station A when transmitting the RAR is calculated based on the position of the time-frequency resource of the PRACH. The Physical Downlink Shared Channel (PDSCH) corresponding to the Physical Downlink Control Channel (PDCCH) scrambled by the RA-RNTI can include responses to one or more preamble sequences (or in other words, the PDSCH may include one or more RAR messages each being a response to one preamble sequence). In particular, each RAR message includes, among other, a preamble sequence (Identity Document) ID, a Time Advance (TA) command, an uplink (UL) grant, and a (Temporary Cell-RNTI (TC-RNTI). Here, the UL grant includes, among others, the following scheduling information: a frequency hopping flag, a Physical Uplink Shared Channel (PUSCH) frequency resource allocation, a PUSCH time resource allocation, a Modulation and Coding Scheme (MCS), a Transmit Power Control (TPC) command for PUSCH, and a Channel State Information (CSI) request.

The size of each RAR is fixed at 56 bits, including:
R: Reserved bit, set to "0",
TA command: 12 bits,
UL Grant: 27 bits, and
TC-RNTI: 16 bits.
Table 1 shows the specific information of the 27-bit UL grant in each RAR:

TABLE 1

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

As shown in Table 1, the UL grant in RAR includes:
Frequency hopping flag: 1 bit,
PUSCH frequency resource allocation: 14 bits,
PUSCH time resource allocation: 4 bits,
MCS: 4 bits,
TPC command for PUSCH: 3 bits, and
CSI request: 1 bit.

On the unlicensed spectrum, a downlink transmission opportunity refers to a set of downlink transmissions (i.e., including one or more downlink transmissions) performed by the base station A. The set of downlink transmissions refers to continuous transmissions (i.e., no interval between the downlink transmissions), or there is an interval between downlink transmissions but the interval is shorter than or equal to 16 μs (microseconds). If the interval between two downlink transmissions performed by the base station is greater than 16 μs, then the two downlink transmissions are considered as belonging to two downlink transmission opportunities.

In the four-step random access procedure on the unlicensed spectrum, LBT is needed before each step of transmission. After the user terminal B transmits the PRACH sequence (Msg1) to the base station A, the user terminal B needs to receive the RAR information (Msg2) from the base station A, and transmits the Msg3 in accordance with the RAR information. Here, the user terminal B needs to perform LBT in accordance with an LBT mode indicated in the RAR information before transmitting the Msg3.

The LBT modes on the unlicensed spectrum include Category 1 (Cat-1) LBT, Category 2 (Cat-2) LBT, Category 3 (Cat-3) LBT, and Category 4 (Cat-4) LBT, in which:

Cat-1 LBT means that a communication device can transmit without channel detection after an interval.

Cat-2 LBT means that a communication device performs a single-slot channel detection. In particular, Cat-2 LBT can include 25 μs single-slot channel detection and 16 μs single-slot channel detection.

Cat-3 LBT means that a communication devices performs a multi-slot channel detection with random back-off based on a fixed contention window size.

Cat-4 LBT means that a communication device performs a multi-slot channel detection with random back-off based on adjustment of the contention window size. In particular, Cat-4 LBT can include different channel access priorities (Channel Access Priority Classes (CAPCs)) depending on priorities of services to be transmitted. Table 2 shows the channel access parameters corresponding to different CAPCs for Cat-4 LBT. The smaller the value of p, the higher the CAPC.

TABLE 2

| CAPC (p) | $m_p$ | $CW_{min,p}$ | $CW_{max,p}$ | $T_{mcot,p}$ | Allowed value of $CW_p$ |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

It is to be noted that in the above Table 2, $m_p$ denotes the number of back-off slots corresponding to the CAPC p, $CW_p$ denotes the contention window size corresponding to the CAPC p, $CW_{min,p}$ denotes the minimum value of $CW_p$ corresponding to the CAPC p, $CW_{max,p}$ denotes the maximum value of $CW_p$ corresponding to the CAPC p, and $T_{mcot,p}$ denotes the maximum channel occupied time length corresponding to the CAPC p.

The CAPC p is determined based on a Quality of Service (QoS) Class Identifier (QCI) of the service. The specific mapping relationship is shown in Table 3 below:

TABLE 3

| Channel Access Priority Class (p) | QCI |
|---|---|
| 1 | 1, 3, 5, 65, 66, 69, 70 |
| 2 | 2, 7 |
| 3 | 4, 6, 8, 9 |
| 4 | — |

It is also to be noted that when the user terminal B is scheduled to transmit PUSCH, regardless of the LBT mode to be used by the user terminal B, the user terminal B expects the base station A to indicate the LBT mode and the CAPC p for PUSCH transmission. Here, if the LBT mode indicated by the base station A is Cat-4, the CAPC p is the priority that the base station A indicates to the user terminal B for use in channel access. If the LBT mode indicated by the base station A is Cat-2, the CAPC p is the CAPC used by the base station A when occupying the channel.

In the random access procedure, the random access response information needs to include the indication information of the LBT category on the unlicensed spectrum when the User Equipment (UE) transmits the Msg3. Currently, the size of each RAR is fixed. If the indication information is to be directly added to the RAR, the size of the RAR would become larger. In this case, the size of the RAR on the unlicensed spectrum would be larger than the size of the RAR on the licensed spectrum, such that the RAR on the unlicensed spectrum and the RAR on the licensed spectrum cannot be transmitted via the same PDSCH, and the overhead of the RAR on the unlicensed spectrum would be relatively larger. The following embodiments of the present disclosure will describe in detail how to determine channel access by the user terminal B for the Msg3 in the random access procedure without changing the size of the RAR on the licensed spectrum by the base station A.

In this system architecture, the exemplary communication system can be Global System of Mobile communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, New Radio based access to unlicensed spectrum (NR-U) system, Universal Mobile Telecommunication System (UMTS), Worldwide Interoperability for Microwave Access (WiMAX) communication system, Wireless Local Area Network (WLAN), Wireless Fidelity (WiFi), next generation communication system, or other communication systems.

Generally, traditional communication systems can support a limited number of connections and are easy to implement. However, with the development of communication technology, mobile communication systems can support not only traditional communications, but also e.g., Device to Device (D2D) communication, Machine to Machine (M2M) communication, and Machine Type Communication (MTC), Vehicle to Vehicle (V2V) communication, etc. The embodiments of the present disclosure can also be applied to these communication systems.

In particular, this exemplary communication system can include a network device and a terminal. When the terminal accesses the mobile communication network provided by the network device, the terminal and the network device can be connected via a wireless communication link, and the communication connection mode can be a single connection mode, a dual connection mode, or a multi-connection mode. When the communication connection mode is the single connection mode, the network device can be an LTE base station or an NR base station (also known as gNB). When the communication mode is the dual connection mode (which can be achieved with the Carrier Aggregation (CA) technology or by a plurality of network devices), and the terminal is connected to a plurality of network devices, the plurality of network devices can include a master base station (Master Cell Group (MCG)) and a secondary base station (Secondary Cell Group (SCG)). The base stations communicate data via a backhaul link. The master base station may be an LTE base station, and the secondary base station may be an LTE base station. Alternatively, the master base station may be an NR base station, and the secondary base station may be an LTE base station. Alternatively, the master base station may be an NR base station, and the secondary base station may be an NR base station. The receiving-side RLC entity as described in the embodiments of the present disclosure may be a terminal or software (such as a protocol stack) and/or hardware (such as a modem) in the terminal. Similarly, the transmitting-side RLC entity may be a network device or software (such as protocol stack) and/or hardware (such as modem) in the network device.

In the embodiments of the present disclosure, the terms "network" and "system" are often used interchangeably, and those skilled in the art can understand their meanings.

The user terminals as described in the embodiments of the present disclosure may include various handheld devices with wireless communication functions, vehicle-mounted devices, wearable devices, computing devices, or other processing devices connected to wireless modems, as well as various forms of User Equipments (UEs), Mobile Stations (MSs), terminal devices, etc. For the purpose of description, the devices mentioned above can be collectively referred to as terminals.

In addition, the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that, in the embodiments of the present disclosure, "B associated with A" means that B is associated with A, and B can be determined from A. However, it can also be appreciated that B being determined from A does not mean that B can be determined from A only, but can be determined from A and/or other information.

Figure 2:
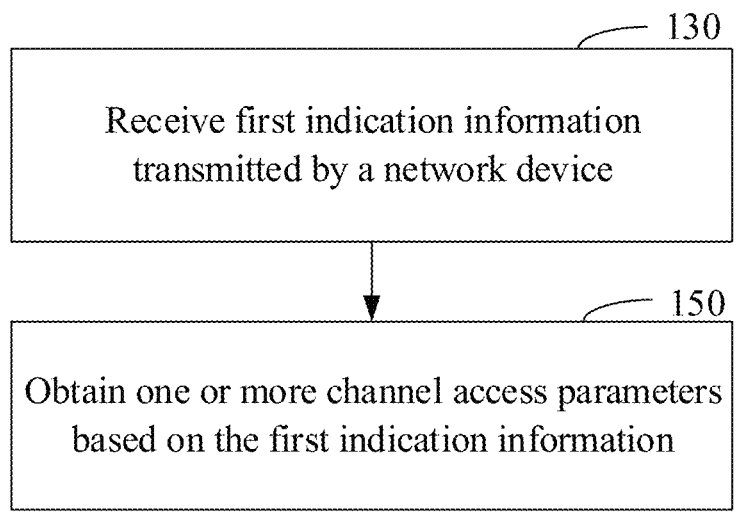
FIG. 2 is a flowchart illustrating a method for indicating channel access according to an embodiment of the present disclosure.

FIG. 2 is a flowchart of a method for indicating channel access according to an embodiment of the present disclosure. As shown in FIG. 2, the method for indicating channel access is applied to a terminal device, and may include the following steps.

At block 130, first indication information transmitted by a network device is received.

Here, the terminal device or UE receives the first indication information transmitted by the network device. The first indication information indicates one or more channel access parameters. The channel access parameters are used for determining channel access for a target uplink transmission. The one or more channel access parameters include a channel access mode and a channel access priority. At block 150, the one or more channel access parameters are obtained in accordance with the first indication information.

Here, the one or more channel access parameter are used for determining channel access for the target uplink transmission. The channel access for the target uplink transmission can be determined based on a channel access mode and a channel access priority in the one or more channel access parameters.

In this embodiment, by receiving the first indication information transmitted by the network device, the one or more channel access parameters can be obtained from the first indication information.

Figure 3:
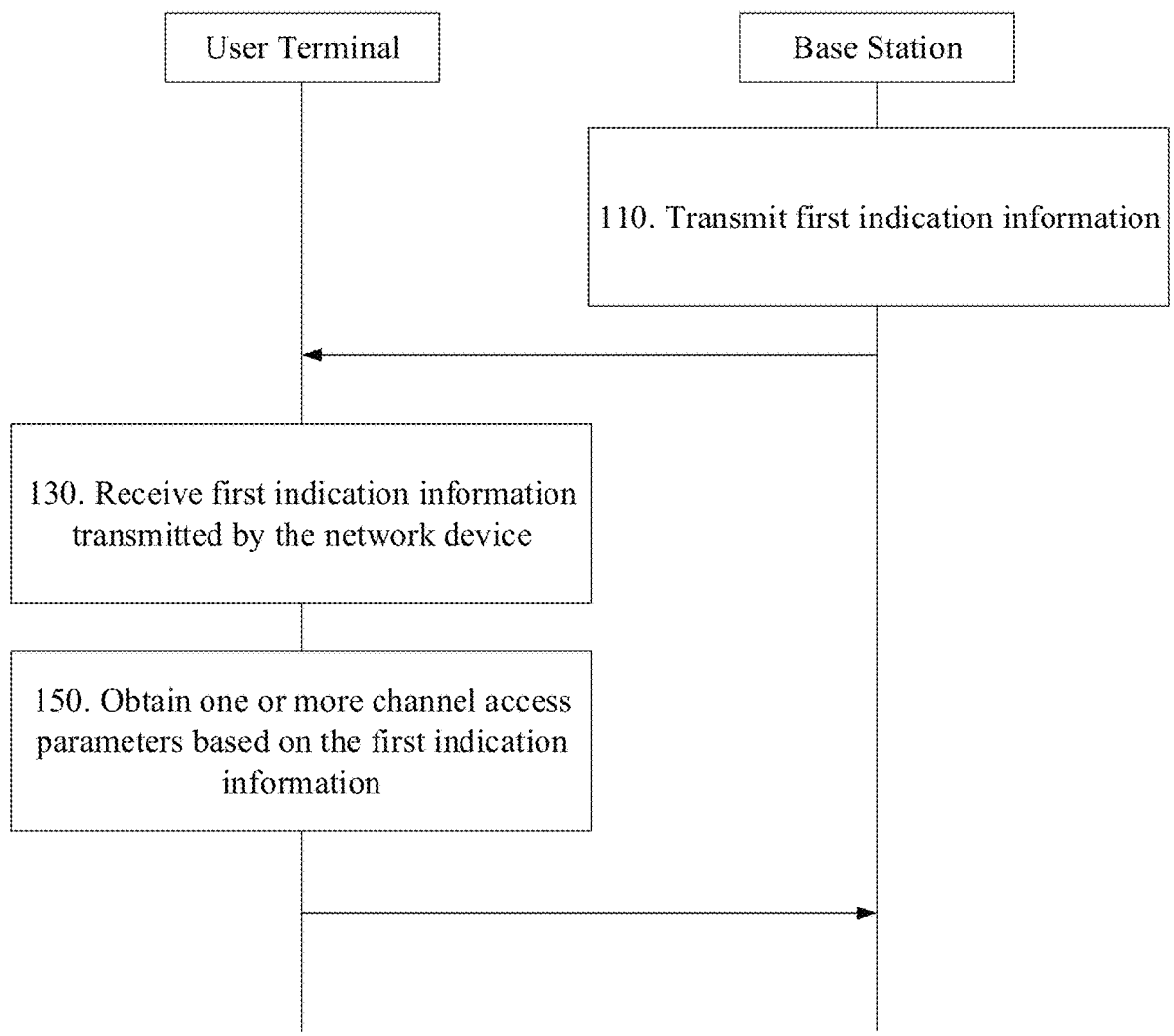
FIG. 3 is a flowchart illustrating a method for indicating channel access according to an embodiment of the present disclosure.

FIG. 3 is a flowchart of a method for indicating channel access according to an embodiment of the present disclosure. As shown in FIG. 3, the method includes the following steps.

At block 110, first indication information is transmitted.

Here, the first indication information includes mode information indicating a channel access mode and/or priority information indicating a channel access priority, such that the channel access mode and the channel access priority indicated in the first indication information can be determined based on the mode information and the priority information in the first indication information. One or more channel access parameters are determined based on the channel access mode and the channel access priority, and then channel access for a target uplink transmission is determined.

The target uplink transmission can be a message 3 (Msg3) in a random access procedure. The first indication information can be carried in a Random Access Response (RAR) message only, or in Downlink Control Information (DCI) only, or in both the RAR message and the DCI. Here, DCI is used to schedule the RAR message.

In at least one embodiment, when the first indication information is carried in the DCI scheduling the RAR message, the RAR message includes at least one RAR scheduled Msg3 that uses the one or more channel access parameters indicated in the first indication information in the DCI for LBT. In an exemplary embodiment, all RAR scheduled Msg3s included in the RAR message use the one or more channel access parameters indicated in the first indication information in the DCI for LBT.

In at least one embodiment, the first indication information may be obtained by reusing a part or all of bits in a frequency resource allocation command field in an uplink grant in the RAR message.

In at least one embodiment, the first indication information may be obtained by reusing bits in a frequency hopping flag command field in the uplink grant in the RAR message.

In at least one embodiment, when the frequency hopping flag command field is not used to indicate whether to perform frequency hopping, the first indication information may be obtained by reusing the bits in the frequency hopping flag command field in the uplink grant in the RAR message and/or reusing a part or all of the bits in the frequency resource allocation command field in the uplink grant in the RAR message.

In at least one embodiment, when the frequency hopping flag command field is used to indicate whether to perform frequency hopping, the first indication information may be obtained by reusing a part or all of the bits in the frequency resource allocation command field in the uplink grant in the RAR message.

In at least one embodiment, when the first indication information reuses a part of the bits in the frequency resource allocation command field in the uplink grant in the RAR message, the part of bits may be at the beginning of the frequency resource allocation field or at the end of the frequency resource allocation field.

In at least one embodiment, the first indication information can also be obtained by reusing a part or all of bits in another redundant command field in the uplink grant in the RAR message. As an example, the other redundant command field may include a power control command field (e.g., TPC command for PUSCH) and/or a CSI request field.

In at least one embodiment, the first indication information may be a newly added information field in the uplink grant in the RAR message.

In at least one embodiment, the first indication information is obtained via a time resource allocation command field in an uplink grant in the RAR message. A time resource allocation indicated in the time resource allocation command field has a mapping relationship with the one or more channel access parameters.

In at least one embodiment, a time resource allocation command field in the uplink grant in the RAR message has in total 4 bits. A mapping relationship between time resource allocations indicated in the time resource allocation command field in the uplink grant in the RAR message and channel access parameters can be configured. Therefore, when the RAR message is received, the one or more channel access parameters can be obtained based on the mapping relationship between the time resource allocations indicated in the time resource allocation command field in the uplink grant in the RAR message and the channel access parameters.

In an embodiment, a 4-bit PUSCH time resource allocation information field is indicated in the RAR uplink grant, and the network can configure the correspondence between PUSCH time resource allocations and channel access parameters in this example. After receiving the PUSCH time resource allocation in the RAR uplink grant, the UE can determine the corresponding channel access parameter(s).

In at least one embodiment, the first indication information may also indicate a starting position of the target uplink transmission.

In at least one embodiment, the starting position of the target uplink transmission may include at least one of the following positions: a starting boundary of a first symbol, a position after the starting boundary of the first symbol and having a distance of 16 μs from the starting boundary of the first symbol, a position after the starting boundary of the first symbol and having a distance of 16 μs plus a length of a time advance from the starting boundary of the first symbol, a position after the starting boundary of the first symbol and having a distance of 25 μs from the starting boundary of the first symbol, a position after the starting boundary of the first symbol and having a distance of 25 μs plus a length of a time advance from the starting boundary of the first symbol, a starting boundary of a second symbol which follows the first symbol and is adjacent to the first symbol.

In at least one embodiment, the second symbol is the first valid uplink symbol in the target uplink transmission.

In at least one embodiment, when the starting position of the target uplink transmission is in the first symbol, the transmission from the starting position to the starting boundary of the second symbol is an extended cyclic prefix of the second symbol.

At block 130, the first indication information transmitted by the network device is received.

At block 150, one or more channel access parameters are obtained based on the first indication information.

In an embodiment of the present disclosure, the first indication information may indicate the one or more channel access parameters, and the channel parameters determined from the first indication information may include one of the following:

1. Cat-1 LBT, Cat-2 LBT with detection interval of 16 μs, Cat-2 LBT with detection interval of 25 μs, or a first priority in Cat-4 LBT;

2. Cat-1 LBT, Cat-2 LBT with detection interval of 16 μs, Cat-2 LBT with detection interval of 25 μs, Cat-4 LBT Priority 1, Cat-4 LBT Priority 2, Cat-4 LBT Priority 3, or Cat-4 LBT Priority 4;

3. Channel access mode and channel access priority, the channel access mode including: Cat-1 LBT, Cat-2 LBT with detection interval of 16 μs, Cat-2 LBT with detection interval of 25 μs, or Cat-4 LBT, and the channel access priority including Cat-4 LBT Priority 1, Cat-4 LBT Priority 2, Cat-4 LBT Priority 3, and Cat-4 LBT Priority 4; or 4. Channel access priority, the channel access priority including Cat-4 LBT Priority 1, Cat-4 LBT Priority 2, Cat-4 LBT Priority 3, and Cat-4 LBT Priority 4.

The above situations will be described in detail below.

1. Cat-1 LBT, Cat-2 LBT with Detection Interval of 16 μs, Cat-2 LBT with Detection Interval of 25 μs, or a First Priority in Cat-4 LBT.

Here, the first priority in Cat-4 LBT can be predetermined or configured by the network device. In at least one embodiment, the value of the first priority may include one of 1, 2, 3, and 4 in Table 2.

As an example, the first priority in Cat-4 LBT can be predetermined to be Cat-4 LBT Priority 1, which is the highest priority, or the first priority in Cat-4 LBT can be determined based on a service to be transmitted with the lowest priority in the target uplink transmission.

The target uplink transmission can be a Msg3 in the random access procedure, and the Msg3 corresponds to a channel access priority in Cat-4 LBT. In an initial access process, when the base station receives a PRACH sequence transmitted by the UE, the base station cannot determine the content of the Msg3 to be transmitted by the UE transmitting the PRACH sequence, and therefore cannot determine the QCI of the Msg3, and thus cannot determine the channel access priority corresponding to the Msg3. Therefore, in at least one embodiment, a priority can be fixed for the LBT corresponding to the Msg3 transmission. For example, the priority of Msg3 transmission may be Cat-4 LBT Priority 2.

In at least one embodiment, the priority when uplink data of the UE is included in the Msg3 is lower than the priority when no uplink data of the UE is included in the Msg3. It should be understood that the smaller the value of priority, the higher the priority. For example, when the uplink data of the UE is included in the Msg3, the corresponding priority is Cat-4 LBT Priority p1, and when no uplink data of the UE is included in the Msg3, the corresponding priority is Cat-4 LBT priority P2, where p1 is greater than p2.

In this exemplary embodiment, the first indication information can be 2 bits, and the first indication information can be obtained by reusing a part or all of bits in a frequency resource allocation command field in an uplink grant in the RAR message and/or by reusing bits in a frequency hopping flag command field in the uplink grant in the RAR message.

2. Cat-1 LBT, Cat-2 LBT with Detection Interval of 16 μs, Cat-2 LBT with Detection Interval of 25 μs, Cat-4 LBT Priority 1, Cat-4 LBT Priority 2, Cat-4 LBT Priority 3, or Cat-4 LBT Priority 4.

Here, the target uplink transmission may be a Msg3 in the random access procedure. It should be understood that when the indicated LBT mode is not Cat-4, the channel access priority is also indicated, which is mainly used in a scenario where a plurality of PUSCHs is continuously transmitted in the time domain in uplink, such that the transmission of the plurality of PUSCHs can be resumed in accordance with the indicated channel access priority after being interrupted. If for the Msg3 only one PUSCH is transmitted in the time domain in uplink, then when the indicated LBT mode is not Cat-4, the channel access priority indication information is not needed. Therefore, if the LBT mode indicated in the first indication information is not Cat-4, there is no need to indicate the channel access priority.

In this exemplary embodiment, the first indication information can be 3 bits, and the first indication information can be obtained by reusing a part or all of bits in a frequency resource allocation command field in an uplink grant in the RAR message and/or by reusing bits in a frequency hopping flag command field in the uplink grant in the RAR message.

3. Channel Access Mode and Channel Access Priority.

Here, the channel access mode includes: Cat-1 LBT, Cat-2 LBT with detection interval of 16 μs, Cat-2 LBT with detection interval of 25 μs, or Cat-4 LBT, and the channel access priority includes: Cat-4 LBT Priority 1, Cat-4 LBT Priority 2, Cat-4 LBT Priority 3, and Cat-4 LBT Priority 4.

Here, the target uplink transmission may be a Msg3 in the random access procedure.

In at least one embodiment, if the LBT mode indicated in the first indication information is Cat-4, the channel access priority indicated in the first indication information is the priority that the base station indicates to the UE for use in channel access.

In at least one embodiment, if the LBT mode indicated in the first indication information is not Cat-4, the channel access priority indicated in the first indication information is the channel access priority used by the base station when occupying the channel.

In an exemplary embodiment, when the first indication information is carried in the RAR message and the DCI, the information indicating the channel access mode in the first indication information is carried in the DCI, and the priority information indicating the channel access priority in the first indication information is carried in the RAR message.

In an exemplary embodiment, when the first indication information is carried in the RAR message and the DCI, the information indicating the channel access mode in the first indication information is carried in the RAR message, and the priority information indicating the channel access priority in the first indication information is carried in the DCI.

As an example, when the one or more channel access parameters include the channel access mode and the channel access priority, the first indication information can be 4 bits, where 2 bits are the mode information indicating the channel access mode, and 2 bits are the priority information indicating the channel access priority. Here, there are 2 bits carried in the RAR message and 2 bits carried in the DCI.

In an exemplary embodiment, the first indication information may include 4 bits, where 2 bits indicate the channel access mode, i.e., the LBT category, and 2 bits indicate the channel access priority, i.e., the LBT priority. The LBT priority may include Cat-4 LBT Priority 1, Cat-4 LBT Priority 2, Cat-4 LBT Priority 3, and Cat-4 LBT Priority 4. Table 4 shows an example of the first indication information in an exemplary embodiment.

TABLE 4

| | LBT Category (2 bits) | LBT Priority p (2 bits) |
| --- | --- | --- |
| 00 | 25 μs Cat-2 | p = 1 |
| 01 | Cat-4 | p = 2 |
| 10 | 16 μs Cat-2 | p = 3 |
| 11 | Cat-1 | p = 4 |

4. Channel Access Priority, the Channel Access Priority Including Cat-4 LBT Priority 1, Cat-4 LBT Priority 2, Cat-4 LBT Priority 3, and Cat-4 LBT Priority 4.

Here, when the channel access parameter indicated in the first indication information is the channel access priority, the channel access mode in the channel access parameter indicated in the first indication information is Cat-4 LBT by default. The channel access priority indicated in the first indication information includes Cat-4 LBT Priority 1, Cat-4 LBT Priority 2, Cat-4 LBT Priority 3, and Cat-4 LBT Priority 4.

In a specific implementation of this embodiment, the first indication information can be 2 bits, and the first indication information can be obtained by reusing a part or all of bits in a frequency resource allocation command field in an uplink grant in the RAR message and/or by reusing bits in a frequency hopping flag command field in the uplink grant in the RAR message.

In an exemplary embodiment, the first indication information may have N bits, and the first indication information may be obtained by reusing N bits in the frequency resource allocation command field in the uplink grant in the RAR message. The N bits may be the first N bits in the frequency resource allocation field or the last N bits in the frequency resource allocation field. In this case, the uplink grant in the RAR message is shown in Table 5 below.

TABLE 5

| RAR grant field | Number of bits |
| --- | --- |
| Frequency hopping flag | 1 |
| First indication information | N |
| PUSCH frequency resource allocation | 14 − N |
| PUSCH time resource allocation | 4 |
| MCS | 4 |
| TPC command for PUSCH | 3 |
| CSI request | 1 |

Here, the N bits in the frequency resource allocation command field in the uplink grant can be used as the first indication information.

Once the one or more channel access parameters are obtained based on the first indication information, the target uplink transmission can be performed in accordance with the one or more channel access parameters.

According to this embodiment, there is no need to add a new command field to indicate the LBT channel access for the Msg3, thereby reducing the overhead of RAR and reducing the complexity of design and implementation, and solving the problem associated with the inconsistency between the size of RAR on the unlicensed spectrum and the size of RAR on the licensed spectrum and the high bit overhead of RAR on the unlicensed spectrum.

In an exemplary embodiment, the method for indicating channel access is applied to a terminal device, and may further include the following step of: receiving second indication information transmitted by the network device.

Here, the second indication information is used for determining a frequency resource allocation mode for the message 3 (Msg3).

In at least one embodiment, the second indication information may be obtained by reusing a part or all of bits in a frequency resource allocation command field in an uplink grant in the RAR message; and/or by reusing bits in a frequency hopping flag command field in the uplink grant in the RAR message.

In at least one embodiment, the frequency resource allocation mode may include: continuous resource allocation or comb resource allocation.

In at least one embodiment, the second indication information may be carried in the RAR message.

In at least one embodiment, when the frequency resource for transmitting the Msg3 is comb resource allocation, the frequency hopping flag command field in the uplink grant in the RAR message is not used for indicating whether to apply frequency hopping or not. When the frequency resource for transmitting the Msg3 is continuous resource allocation, the frequency hopping flag command field in the uplink grant in the RAR message may be configured to not indicate whether to apply frequency hopping or not.

In at least one embodiment, when the frequency hopping flag command field is not used for indicating whether to apply frequency hopping or not, the second indication message may be obtained by reusing the bits in the frequency hopping flag command field in the uplink grant in the RAR message and/or by reusing a part or all of the bits in the frequency resource allocation command field in the uplink grant in the RAR message. When the frequency hopping flag command field is used for indicating whether to apply frequency hopping or not, the second indication message may be obtained by reusing a part or all of the bits in the frequency resource allocation command field in the uplink grant in the RAR message. The part of the bits may be at the beginning of the frequency resource allocation field, or may be at the end of the frequency resource allocation field.

In at least one embodiment, the second indication information can also be obtained by reusing a part or all of bits in another redundant command field in the uplink grant in the RAR message. As an example, the other redundant command field may include a power control command field (e.g., TPC command for PUSCH) and/or a CSI request.

In at least one embodiment, the second indication information may be a newly added information field in the uplink grant in the RAR message.

In an exemplary embodiment, the first indication information may have N bits, and the second indication information may have M bits. The first indication information may be obtained by reusing N bits in the frequency resource allocation command field in the uplink grant in the RAR message. The N bits may be the first N bits in the frequency resource allocation domain, or may be the last N bits in the frequency resource allocation domain.

The second indication information may be obtained by reusing a part or all of the bits in the frequency resource allocation command field in the uplink grant in the RAR message. The M bits may be the first M bits in the frequency resource allocation field, or may be the last M bits in the frequency resource allocation field. In this case, the uplink grant in the RAR message is shown in Table 6 below.

TABLE 6

| RAR grant field | Number of bits |
|---|---|
| Frequency hopping flag | 1 |
| Second indication information | M |
| First indication information | N |
| PUSCH frequency resource allocation | 14 − N − M |
| PUSCH time resource allocation | 4 |
| MCS | 4 |
| TPC command for PUSCH | 3 |
| CSI request | 1 |

Here, in the frequency resource allocation command field in the uplink grant, N bits are used as the first indication information, and M bits are used as the second indication information.

In at least one embodiment, the value of M may be 1.

In this embodiment, the frequency resource allocation mode for the Msg3 is determined based on the second indication information.

In an exemplary embodiment, the method for indicating channel access is applied to a network device, and may further include the following step of: transmitting the second indication information to the terminal device.

Here, the second indication information is used for determining the frequency resource allocation mode of the message 3.

Figure 4:
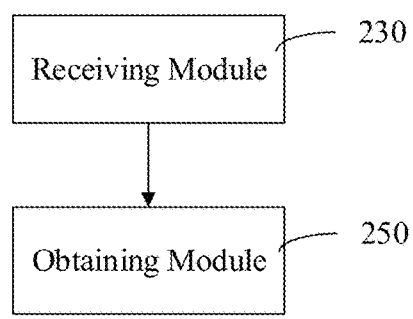
FIG. 4 is a block diagram of an apparatus for implementing a method for indicating channel access according to any of the embodiments of the present disclosure.

FIG. 4 is a block diagram of an apparatus for implementing a method for indicating channel access according to any of the embodiments of the present disclosure. The apparatus may be a terminal device. As shown in FIG. 4, the apparatus may include, but not limited to, a receiving module 230 and an obtaining module 250.

The receiving module 230 is configured to receive first indication information transmitted by a network device.

The obtaining module 250 is configured to obtain one or more channel access parameters based on the first indication information. The one or more channel access parameters are used for determining channel access for a target uplink transmission.

In an exemplary embodiment, the receiving module 230 can be further configured to receive second indication information transmitted by the network device. The second indication information is used for determining a frequency resource allocation mode for a message 3.

For the implementation of the functions and operations of each of the modules in this embodiment and other parts that are not elaborated or defined in detail, reference can be made to the description of the above embodiments, and details thereof will be omitted here.

Figure 5:
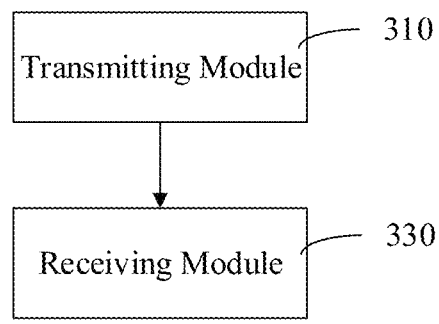
FIG. 5 is a block diagram of an apparatus for implementing a method for indicating channel access according to any of the embodiments of the present disclosure.

FIG. 5 is a block diagram of an apparatus for implementing a method for indicating channel access according to any of the embodiments of the present disclosure. The apparatus may be a network device. As shown in FIG. 5, the apparatus may include, but not limited to, a transmitting module 310 configured to transmit first indication information to a terminal device. The first indication information is used for obtaining one or more channel access parameters.

The one or more channel access parameters are used for determining channel access for a target uplink transmission.

In an exemplary embodiment, the transmitting module 310 can be further configured to: transmit second indication information to the terminal device. The second indication information is used for determining a frequency resource allocation mode of a message 3.

In at least one embodiment, the network device may further include a receiving module 330 configured to receive the target uplink transmission that is performed in accordance with the one or more channel access parameters.

For the implementation of the functions and operations of each of the modules in this embodiment and other parts that are not elaborated or defined in detail, reference can be made to the description of the above embodiments, and details thereof will be omitted here.

Figure 6:
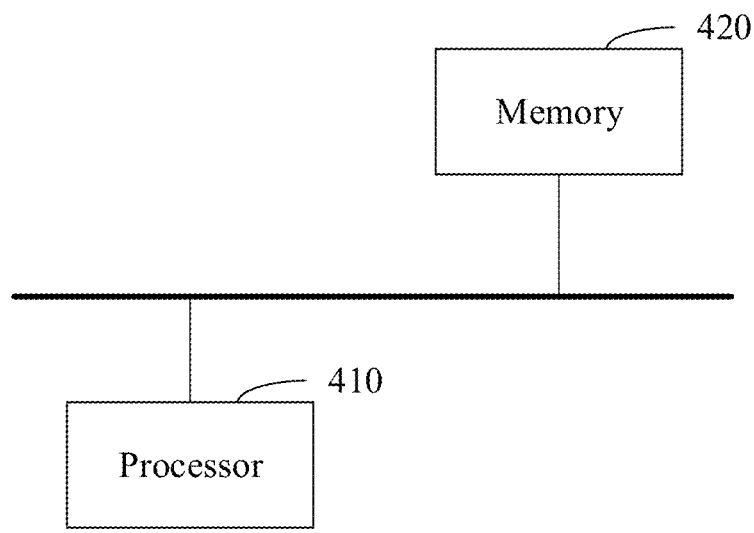
FIG. 6 is a schematic diagram showing a hardware structure of an apparatus for indicating channel access according to Embodiment 5 of the present disclosure.

FIG. 6 is a schematic diagram showing a hardware structure of an apparatus for indicating channel access according to Embodiment 5 of the present disclosure. As shown in FIG. 6, a terminal device includes a processor 410 and a memory 420. The above components of the terminal device are communicatively connected with each other through a bus system.

The processor 410 may be an independent component or a plurality of processing elements. For example, it may be a CPU, an ASIC, or one or more integrated circuits configured to implement the above methods, such as at least one microprocessor or DSP, or at least one programmable gate array or FPGA.

The memory 420 can store a program executable on the processor 410, and the program, when executed by the processor 410, implements a part or all of the steps of the method for indicating channel access according to any of the above method embodiments.

An embodiment of the present disclosure also provides a computer readable storage medium. The computer readable storage medium stores a computer program which, when executed, implements a part or all of the steps of the method for indicating channel access according to any of the above method embodiments.

An embodiment of the present disclosure also provides a computer program product. The computer program product is stored in a non-transitory computer readable storage medium. The computer program, when executed, implements a part or all of the steps of the method for indicating channel access according to any of the above method embodiments. The computer program product may be a software installation package.

An embodiment of the present disclosure also provides a chip. The chip includes a processor configured to invoke and execute a computer program from a memory, to cause a device provided with the chip to perform a part or all of the steps of the method for indicating channel access according to any of the above method embodiments.

An embodiment of the present disclosure also provides a computer program which, when executed, implements a part or all of the steps of the method for indicating channel access according to any of the above method embodiments.

The steps of the method or algorithm described in any the embodiments of the present disclosure may be implemented in hardware, or may be implemented by a processor executing software instructions. The software instructions can be composed of corresponding software modules, which can be stored in a Random Access Memory (RAM), a flash memory, a Read Only Memory (ROM), an Erasable Programmable ROM (EPROM), an Electrically EPROM (EEPROM), a register, a hard disk, a portable hard disk, a CD-ROM, or any other form of storage medium known in the art. An exemplary storage medium can be coupled to a processor, such that the processor can read information from the storage medium and can write information to the storage medium. Of course, the storage medium may also be an integral part of the processor. The processor and the storage medium may be located in an ASIC. In addition, the ASIC may be located in an access network device, a target network device, or a core network device. Of course, the processor and the storage medium may also exist, as discrete components, in the access network device, the target network device, or the core network device.

It can be appreciated by those skilled in the art that, in one or more of the above examples, the functions described in the embodiments of the present disclosure may be implemented in whole or in part in software, hardware, firmware, or any combination thereof. When implemented by software, they can be implemented in the form of a computer program product in whole or in part. The computer program product includes one or more computer instructions. When the computer program instructions are loaded and executed on a computer, the processes or functions described in the embodiments of the present disclosure are provided in whole or in part. The computer may be a general purpose computer, an application specific computer, a computer network, or any other programmable device. The computer instructions may be stored in a computer-readable storage medium or transmitted from one computer readable storage medium to another. For example, the computer instructions may be transmitted from one website, computer, server, or data center to another via a wired (such as coaxial cable, optical fiber, Digital Subscriber Line (DSL)) or wireless (such as infrared, wireless, microwave, etc.) connection. The computer readable storage medium may be any usable medium that can be accessed by a computer or a data storage device such as a server or a data center integrated with one or more usable medium. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc.

The embodiments above further describe the objects, technical solutions, and advantageous effects of the embodiments of the present disclosure in detail. It should be understood that the above are only specific implementations of the embodiments of the present disclosure and are not intended to limit the scope of the embodiments of the present disclosure. Any modifications, equivalents, improvements, etc. that are made on the basis of the technical solutions of the embodiments of the present disclosure are to be encompassed by the scope of the embodiments of the present disclosure.

It should be understood that the present disclosure is not limited to the specific structure that has been described above and shown in the figure. Various modifications and changes can be performed without departing from the scope of the present disclosure, which is defined only by the claims as attached.

What is claimed is:

1. A method for indicating channel access, applied in a terminal device, the method comprising:
   receiving first indication information transmitted by a network device; and
   obtaining one or more channel access parameters based on the first indication information, the one or more channel access parameters being used for determining channel access for a target uplink transmission;
   wherein the first indication information comprises: mode information indicating a channel access mode;
   wherein the target uplink transmission comprises Message 3 in a random access procedure;
   wherein the first indication information is carried in a Random Access Response (RAR) message; and
   wherein the first indication information being carried in the RAR message comprises: the first indication information being obtained by reusing a part of bits in a Physical Uplink Shared Channel (PUSCH) frequency resource allocation field in a RAR grant field in the RAR message.

2. The method of claim 1, wherein the first indication information being obtained by reusing a part of bits in the PUSCH frequency resource allocation field in the RAR grant field in the RAR message comprises:
the first indication information occupying N bits of the PUSCH frequency resource allocation field, which occupies 14 bits in the RAR grant field.

3. The method of claim 1, wherein the first indication information occupies 2 bits.

4. The method of claim 1, wherein the first indication information further indicates a starting position of the target uplink transmission.

5. The method of claim 4, wherein the starting position of the target uplink transmission includes one of:
a starting boundary of a first symbol;
a position after a starting boundary of a first symbol and having a distance of 16 μs plus a length of a time advance from the starting boundary of the first symbol;
a position after a starting boundary of a first symbol and having a distance of 25 μs from the starting boundary of the first symbol;
a position after a starting boundary of a first symbol and having a distance of 25 μs plus a length of a time advance from the starting boundary of the first symbol; or
a starting boundary of a second symbol that follows a first symbol and is adjacent to the first symbol.

6. The method of claim 5, when the starting position of the target uplink transmission is in the first symbol, a transmission from the starting position to the starting boundary of the second symbol is an extended cyclic prefix of the second symbol.

7. A method for indicating channel access, applied in a network device, the method comprising:
transmitting first indication information to a terminal device, the first indication information being used for obtaining one or more channel access parameters,
wherein the one or more channel access parameters are used for determining channel access for a target uplink transmission;
wherein the first indication information comprises: mode information indicating a channel access mode;
wherein the target uplink transmission comprises Message 3 in a random access procedure;
wherein the first indication information is carried in a Random Access Response (RAR) message; and
wherein the first indication information being carried in the RAR message comprises: the first indication information being obtained by reusing a part of bits in a Physical Uplink Shared Channel (PUSCH) frequency resource allocation field in a RAR grant field in the RAR message.

8. The method of claim 7, wherein the first indication information being obtained by reusing a part of bits in the PUSCH frequency resource allocation field in the RAR grant field in the RAR message comprises:
the first indication information occupying N bits of the PUSCH frequency resource allocation field, which occupies 14 bits in the RAR grant field.

9. The method of claim 7, wherein the first indication information occupies 2 bits.

10. The method of claim 7, wherein the first indication information further indicates a starting position of the target uplink transmission.

11. The method of claim 10, wherein the starting position of the target uplink transmission includes one of:
a starting boundary of a first symbol;
a position after a starting boundary of a first symbol and having a distance of 16 μs plus a length of a time advance from the starting boundary of the first symbol;
a position after a starting boundary of a first symbol and having a distance of 25 μs from the starting boundary of the first symbol;
a position after a starting boundary of a first symbol and having a distance of 25 μs plus a length of a time advance from the starting boundary of the first symbol; or
a starting boundary of a second symbol that follows a first symbol and is adjacent to the first symbol.

12. The method of claim 11, when the starting position of the target uplink transmission is in the first symbol, a transmission from the starting position to the starting boundary of the second symbol is an extended cyclic prefix of the second symbol.

13. A terminal device, comprising a processor and a memory, wherein the memory is configured to store a program executable on the processor, and the program, when executed by the processor, causes the processor to:
receive first indication information transmitted by a network device; and
obtain one or more channel access parameters based on the first indication information, the one or more channel access parameters being used for determining channel access for a target uplink transmission;
wherein the first indication information comprises: mode information indicating a channel access mode;
wherein the target uplink transmission comprises Message 3 in a random access procedure;
wherein the first indication information is carried in a Random Access Response (RAR) message; and
wherein the first indication information being carried in the RAR message comprises: the first indication information being obtained by reusing a part of bits in a Physical Uplink Shared Channel (PUSCH) frequency resource allocation field in a RAR grant field in the RAR message.

* * * * *